United States Patent [19]

Pez et al.

[11] Patent Number: 4,617,029
[45] Date of Patent: Oct. 14, 1986

[54] METHOD FOR GAS SEPARATION

[75] Inventors: Guido P. Pez, Allentown; Richard T. Carlin, Macungie, both of Pa.

[73] Assignee: Air Products and Chemicals, Inc., Allentown, Pa.

[21] Appl. No.: 707,298

[22] Filed: Mar. 1, 1985

[51] Int. Cl.$^4$ .............................................. B01D 53/22
[52] U.S. Cl. ........................................ 55/16; 55/68; 55/158; 423/210.5; 423/219; 423/641; 423/DIG. 12
[58] Field of Search ............................. 55/16, 68, 158; 423/210.5, 219, 235, 641-643, DIG. 12

[56] References Cited

U.S. PATENT DOCUMENTS

| | | | |
|---|---|---|---|
| 3,155,467 | 11/1964 | Yamamoto et al. | 55/16 |
| 3,208,883 | 9/1965 | Crouthamel et al. | 55/16 X |
| 3,335,545 | 8/1967 | Robb et al. | 55/16 |
| 3,359,705 | 12/1967 | Mullhaupt | 55/16 |
| 3,396,510 | 8/1968 | Ward et al. | 55/16 |
| 3,400,054 | 9/1968 | Ruka et al. | 204/1 |
| 3,432,363 | 3/1969 | Gillis | 136/153 |
| 3,503,186 | 3/1970 | Ward | 55/16 |
| 3,527,618 | 9/1970 | Bushnell | 136/86 |
| 3,552,912 | 1/1971 | Bartholomew et al. | 423/210.5 |
| 3,676,220 | 7/1972 | Ward | 136/86 |
| 3,727,058 | 4/1973 | Schrey | 250/83.3 H |
| 3,819,806 | 6/1974 | Ward et al. | 423/220 |
| 3,823,529 | 7/1974 | Hughes et al. | 55/16 |
| 3,993,542 | 11/1976 | Blum et al. | 55/16 X |
| 3,996,335 | 12/1976 | Wolk et al. | 423/210.5 |
| 4,014,665 | 3/1977 | Steigelmann | 55/16 |
| 4,015,955 | 4/1977 | Steigelmann et al. | 55/16 |
| 4,119,408 | 10/1978 | Matson | 422/169 |
| 4,132,766 | 1/1979 | Erickson | 423/219 X |
| 4,147,754 | 4/1979 | Ward | 423/224 |
| 4,174,374 | 11/1979 | Matson | 423/232 |
| 4,317,865 | 3/1982 | Trocciola et al. | 429/41 |
| 4,318,714 | 3/1982 | Kimura et al. | 55/16 |
| 4,330,633 | 5/1982 | Yoshisato et al. | 501/152 |
| 4,340,578 | 7/1982 | Erickson | 423/210.5 X |
| 4,343,715 | 8/1982 | Bonaventura et al. | 55/68 X |
| 4,396,572 | 8/1983 | Batigne et al. | 264/510 |
| 4,529,577 | 7/1985 | Chen et al. | 423/210.5 X |

FOREIGN PATENT DOCUMENTS 2082156 3/1982 United Kingdom .

OTHER PUBLICATIONS

Way et al., *J. Membrane Science*, vol. 12 (1982), pp. 239–259.
Bassett et al., *Biochimica et Biophysica Acta*, vol. 211 (1970), pp. 194–215.
Gryaznov et al., *Russ. J. Phys. Chem.*, vol. 47 (1973), pp. 1517–1519.
Zambonin et al., *J. Am. Chem. Soc.*, vol. 91 (1969), pp. 2225–2228.
Zambonin, *Electroanal. Chem. and Interfacial Electrochem.*, vol. 45 (1973), pp. 451–458.
Flinn et al., *J. Electroanal. Chem.*, vol. 63 (1975), pp. 39–57.
Stern et al., *J. Phys. Chem.*, vol. 83 (1979), pp. 2848–2854.
Baikov et al., *Kinetika i Kataliz*, vol. 23 (1982), pp. 573–577 and vol. 24 (1983), pp. 502–505.
Stern et al., *J. Electrochem. Soc.*, vol. 124 (1977), pp. 641–649.
Fontana et al., *Ind. and Eng. Chem.*, vol. 44 (1952), pp. 369–378.
Leenaars et al., *J. Materials Sci.*, vol. 19 (1984), pp. 1077–1088.
Schweitzer, ed., "Handbook of Separation Techniques for Chemical Engineers," McGraw-Hill, New York (1979) 2-19 to 2-26 and 2-61 to 2-65.

*Primary Examiner*—Robert Spitzer
*Attorney, Agent, or Firm*—Mark L. Rodgers; E. Eugene Innis; James C. Simmons

[57] ABSTRACT

A process for separating a gas from a mixture of gases comprises passing the gas mixture over a membrane, selectively permeable by the gas being separated, owing to the occurrence of one or more reversible oxidation-reduction reactions between a continuous layer of active molten material, immobilized in a rigid, porous, inert support therefor, and the gas being separated.

28 Claims, 4 Drawing Figures

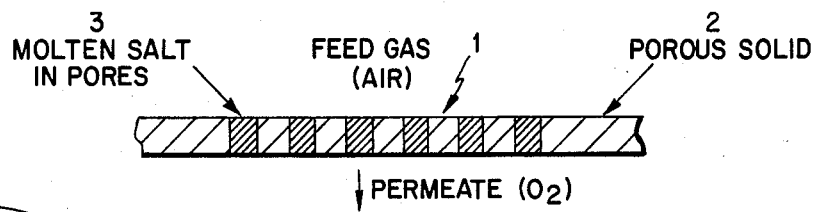
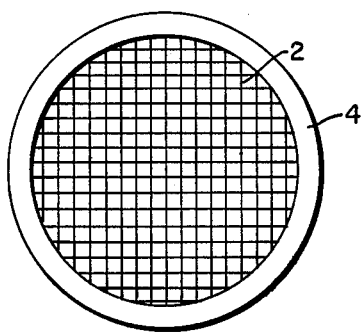
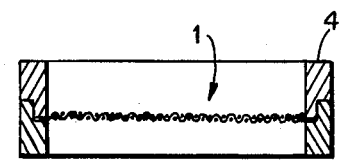
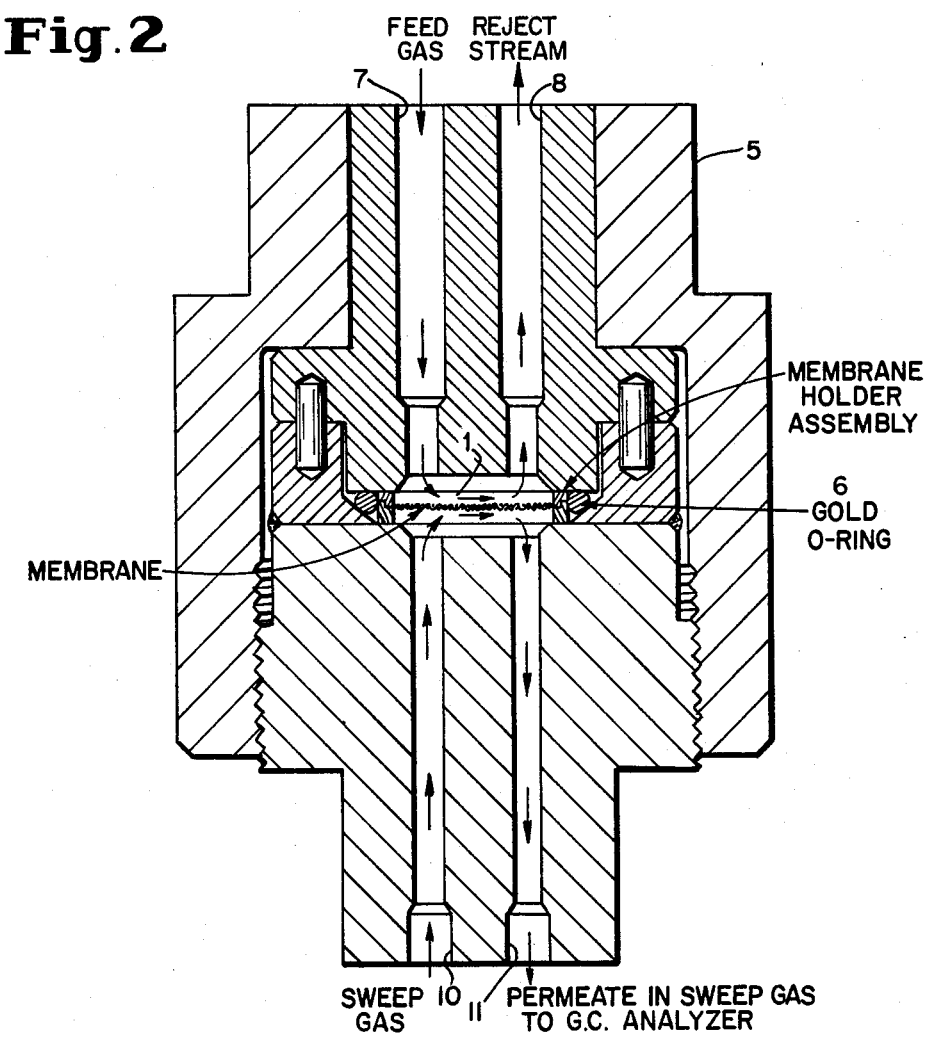

METHOD FOR GAS SEPARATION

DESCRIPTION

TECHNICAL FIELD

This invention relates to an improved method for separation of a gas from a mixture of gases and to improved membranes for the separation process.

BACKGROUND ART

Numerous approaches to the separation of a gas from a mixture of gases by differential permeation have been investigated. Robb et al., in U.S. Pat. No. 3,335,545, have proposed use of a liquid, entrapped in a porous or permeable support, to separate mixtures of gases. The use of a so-called "quasi-liquid film," for example, diethylene glycol, in a support has permitted separation of carbon dioxide from nitrogen, hydrogen or oxygen, the selectivity being somewhat higher than would be predicted on the basis of the molecular weights of the gases as the sole factor, influencing separation. Ward, III, has proposed, in U.S. Pat. No. 3,503,186, a similar procedure for separating sulfur dioxide from other gases.

The use of facilitated transport liquid membranes has been reviewed by Way et al., *J. Membrane Science*, vol. 12 (1982), pages 239-259. Another typical disclosure of gas separation using a facilitated transport immobilized liquid membrane is that of Bassett et al., *Biochimica et Biophysica Acta*, vol. 211 (1970), pages 194-215. Facilitated transport of gases through liquid membranes is also recited, for example, in the following U.S. Patents:

U.S. Pat. No. 3,396,510, Ward, III, et al.
U.S. Pat. No. 3,676,220, Ward, III
U.S. Pat. No. 3,819,806, Ward, III, et al.
U.S. Pat. No. 4,014,665, Steigelmann
U.S. Pat. No. 4,015,955, Steigelmann et al.
U.S. Pat. No. 4,119,408, Matson
U.S. Pat. No. 4,147,754, Ward, III
U.S. Pat. No. 4,174,374, Matson Ward, III, et al. '510 recite using an immobilized liquid film as a permeable membrane, wherein the liquid film contains at least one soluble, non-volatile, dissolved carrier species, which is reversibly chemically reactive with a selected component of a gaseous mixture.

Kimura et al. (U.S. Pat. No. 4,318,714) have recited using an ion-exchange membrane to accomplish facilitated separation of a gas from a mixture of gases.

Yamamoto et al. (U.S. Pat. No. 3,155,467) have disclosed separation and purification of hydrogen, using a palladium alloy as a permeable wall structure.

Solid and molten salt electrolytes have been disclosed, in the fuel cell or electrochemical arts, in the following representative patents:

U.S. Pat. No. 3,400,054, Ruka et al.
U.S. Pat. No. 3,432,363, Gillis
U.S. Pat. No. 3,527,618, Bushnell
U.S. Pat. No. 3,727,058, Schrey
U.S. Pat. No. 4,317,865, Trocciola et al.
U.S. Pat. No. 4,330,633/U.K. 2,082,156, Yoshisato et al.

Yoshisato et al., in U.S. Pat. No. 4,330,633, recite using a solid electrolyte comprising a sintered body of mixed inorganic metal oxides as a membrane for the regeneration of oxygen at relatively high temperatures (about 800° C.).

Oxygen is known to permeate selectively through metallic silver. However, oxygen fluxes at reasonable temperatures (about 400° C.) are low, as reported by Gryaznov et al., *Russian. J. Phys. Chem.*, vol. 47 (1973), pages 1517–1519. At higher temperatures, metallic membranes for the separation of oxygen from other gases are unstable, see Mulhaupt, U.S. Pat. No. 3,359,705.

A limiting feature in many of these disclosures is that a gas should not completely permeate the electrolyte or electrode, since complete penetration could short circuit the device.

Batigne et al., U.S. Pat. No. 4,396,572, recite using a porous ceramic barrier, having a plurality of superimposed layers of pastes of varying composition, to separate uranium hexafluoride isotopes by ultrafiltration.

It is apparent that presently available membranes for separation of gases by conventional diffusion, permeation or ultrafiltration methods have low permeation rates, are relatively unselective or are complex in structure.

It is therefore an object of this invention to provide methods and articles for the separation of gases from mixtures, which have higher permeation rates and much higher selectivity than presently available methods and membranes and which are also more simple to construct and to use.

DISCLOSURE OF INVENTION

In one aspect, this invention relates to a process for separating at least one gas from a mixture of gases, comprising passing the gas mixture over a membrane selectively permeable to the gas being separated as a result of the occurrence of one or more reversible oxidation-reduction reactions; wherein the membrane comprises a thin, porous, rigid, inert support in which is immobilized the active material and the active material is a molten salt, capable of one or more reversible oxidation-reduction reactions with the gas being separated.

In another aspect, this invention relates to a process for the separation of a gas from a mixture of gases, comprising introducing the mixture into a module having a feed gas inlet, a reject gas outlet and a permeate gas outlet and containing a membrane, having a feed side and a permeate side, selectively permeable to the gas being separated, which membrane comprises a thin, porous inert support within which is immobilized an active material and the active material is a molten salt capable of undergoing at least one reversible oxidation-reduction reaction with the gas being separated; passing the gas mixture through the feed inlet and into contact with the inlet side of the membrane; removing from the inlet side of the membrane a gas stream rejected by the membrane and removing through the permeate gas outlet the gas passing relatively through the membrane.

In yet another aspect, this invention relates to a selectively-permeable membrane for the separation of a gas from a mixture of gases, comprising a thin, porous, inert support in the pores of which is immobilized a molten active material, which active material is a molten salt capable of undergoing one or more reversible oxidation-reduction reactions with the gas being separated.

"Salt," as used in the specification and claims, means a substance which is comprised of cations and anions and is characterized by electrical overall neutrality. The cations or anions may be of any chemical composition, including organic and inorganic ions, or a combination of both. It will be understood that salts have a wide range of melting points and that, for the purposes of this invention, the melting point of the salt used as active material is the minimum temperature, at which the membranes of this invention can be used for separation of a gas from a mixture of gases.

"Immobilized," as used in the specification and claims, refers to molten active material, captured within the pores or interstices of the ceramic or other support, as well as any material in the form of a thin film of salt melt on the surface of the support. It is also contemplated that the molten salt does not necessarily fill the entire volume of the porous support, but it is believed that a thin continuous layer of molten salt in or on the support is necessary for the successful operation of the membranes.

"Reversible oxidation-reduction reaction," as used in the specification and claims essentially means an oxidation-reduction reaction which can go forward to the right or in reverse to the left, depending upon the relative concentrations of reactants and products at any time. Representative reactions include interconversion between nitrate and nitrite ions:

$$2NO_3^- \rightleftharpoons 2NO_2^- + O_2$$

It is proposed that oxides are produced by reactions such as:

$$4NO_3^- \rightleftharpoons 2O^= + 4NO_2 + O_2$$

and that the oxides in the melt, including one or more of $O^=$, $O_2^=$ and $O_2^-$, catalyze the reaction.

Another type of oxidation-reduction reaction which can be exploited in the practice of this invention includes interconversion of oxygen-oxide species:

$$O_2 \underset{-e^-}{\overset{+e^-}{\rightleftharpoons}} O_2^- \underset{-e^-}{\overset{+e^-}{\rightleftharpoons}} O_2^=$$

A further exemplary oxidation-reduction reaction is that involving oxidation of hydrogen by hydroxide ions:

$$H_2 + OH^- \rightleftharpoons H_2O + H^-$$

In a representative case, an alkali metal nitrate molten salt membrane is first activated by allowing some of the nitrate ($NO_3^-$) ions to lose oxygen and to form nitrite ($NO_2^-$) ions in the melt spontaneously, as result of heating.

$$M^+NO_3^- \rightleftharpoons M^+NO_2^- + \tfrac{1}{2}O_2$$

The working molten salt membrane will thus contain both an alkali metal nitrate and an alkali metal nitrite. The operation of the membrane can be further visualized as follows:

At the feed side of the membrane nitrogen and oxygen are in contact with the surface of the alkali metal nitrate/nitrite melt. The initial condition is as depicted in the following cross-sectional diagram of the membrane:

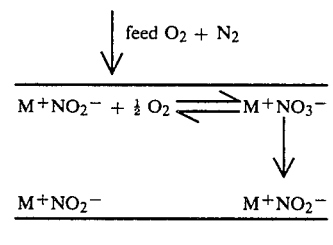

The excess concentration of nitrate ions at the feed side of the membrane will promote their diffusion towards the permeate side. At this interface, there is a much lower partial pressure of oxygen, than at the feed interface, therefore nitrate ions will reversibly dissociate into nitrite ions and liberate oxygen, which is removed in the permeate stream. The steady station condition of the membrane is shown in the diagram below, in which nitrite ions thus formed at the permeate side diffuse back to a region of lower concentration at the feed side to complete the overall cycle, which amounts to net transport of oxygen through the membrane. The net transport of oxygen arises from the reversible reactivity of oxygen with nitrite ions and mobility of the nitrite and nitrate ions in the salt.

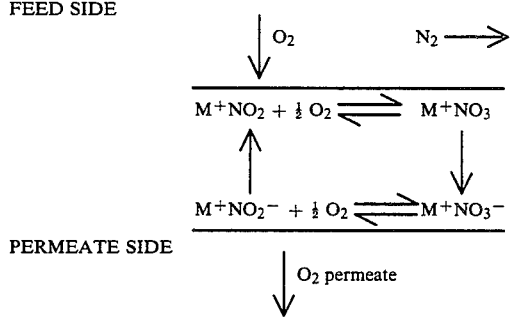

The other feed gas, nitrogen, does not react with the molten salt. Because there is no mechanism by which nitrogen can be actively transported through the melt, it will be largely rejected at the feed side of the membrane. In this way, excellent separation of nitrogen and oxygen is achieved.

Although the foregoing gives an attempt to provide a theoretical explanation of the mechanism of the process of the present invention, it will be understood that the inventors do not wish to be bound by such explanation and rely on the appended claims to define the invention.

It is proposed that the use of an alkali metal nitrate melt membrane for separation of oxygen from air relies on the nitrate-nitrite interconversion. However, the reaction between oxygen and oxide species may also be occuring, as discussed more fully by Zambonin et al., *J. Am. Chem. Soc.*, vol. 91 (1969), pages 2225-2228; Zambonin, *Electroanalytical Chemistry and Interfacial Electrochemistry*, vol. 45 (1973), pages 451-458 and Flinn et al., *J. Electroanal. Chem.*, vol 63 (1975), pages 39-57.

It is also known that other molten salt systems react reversibly with oxygen by processes involving equilibria with reduced oxygen species, particularly oxide ($O^=$), peroxide ($O_2^=$) and superoxide ($O_2^-$). For example, it has been reported that $Na_2O-Na_2SO_4$ melts take up oxygen reversibly at 920° C., presumably by the reactions:

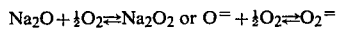
$$Na_2O + \tfrac{1}{2}O_2 \rightleftharpoons Na_2O_2 \text{ or } O^= + \tfrac{1}{2}O_2 \rightleftharpoons O_2^=$$

Stern et al., *J. Phys. Chem.*, vol. 83 (1979), pages 2848–2854. It is also thought that redox equilibria, involving the decomposition of sulfate to sulfite and gaseous sulfur dioxide, are involved.

It is expected that hydrogen-hydride interconversion in molten alkali metal hydroxide membranes of the invention would operate in accordance with the behavior reported by Baikov et al., "Activation of Molecular Hydrogen by Solid and Fused Hydroxides. III. Kinetics and Mechanism of Isotope Exchange Between Hydrogen and Solutions of Water in Alkali Melts" and "IV. The Role of Cations in the Catalysis of Homomolecular Exchange of Hydrogen on Solid Hydroxides," *Kinetika i Kataliz*, vol. 23 (1982), pages 573–577 and vol. 24 (1983), pages 502–505.

Reversible oxygen uptake from $Na_2O$-NaCl melts is also known, Stern et al., *J. Electrochem. Soc.*, vol. 124 (1977), pages 641–649.

Cuprous chloride-alkali metal halide melts, e.g., $CuCl$-$CuCl_2$-KCl, are also known to react reversibly with oxygen, probably by the reaction:

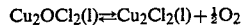
$$Cu_2OCl_2(l) \rightleftharpoons Cu_2Cl_2(l) + \tfrac{1}{2}O_2$$

Fontana et al., *Ind. Eng. Chem.*, vol. 44 (1952), pages 369–378.

Because of the complexity of the redox processes, thought to occur in salt melts, it is understood that the processes of this invention include transfer of gases, capable of undergoing an oxidation-reduction reaction with a molten salt, immobilized in a support, regardless of the mechanism by which the process actually takes place.

The membranes of the present invention are represented macroscopically in FIG. 1, for the separation of a permeable gas ($O_2$) from a mixture of gases, air. The porous solid is a rigid, or slightly flexible, inert material, selected from metallic, polymeric or ceramic substrates. The support material is filled or coated with at least a continuous layer of the selected molten salt, or mixture thereof. The feed gas passes over the feed side of the membrane, as shown by the mixture (air) on the upper side of FIG. 1. The reactive member of the gas mixture will undergo one or more reversible reactions with ions in the molten salt, as discussed above. Eventually, at steady state conditions, the reactive gas ($O_2$) permeates the membrane. In an experimental context, the reactive or permeate gas ($O_2$) is removed from the system by an inert sweep gas and a sample of the sweep gas stream is transferred to a gas chromatograph for analysis. In large scale utilization of the invention, it will be preferred to exhaust permeate gas from the system with a compressor and transfer relatively pure permeate gas to a process requiring it or to containers.

It is proposed that the gas pressure, required to displace liquid, that is immobilized by capillary forces, from the pores of a porous wetted membrane, conforms to the equation (Porter, "Handbook of Separation Techniques for Chemical Engineers," Schweitzer, ed., McGraw-Hill (1979), Appendix A, page 2–89):

$$P = (4\tau \cos \theta)/d$$

wherein $\tau$ is the surface tension of the gas-liquid interface, $\theta$ is the contact angle between the liquid and the pore wall and d is the pore size.

In qualitative terms, the salt or mixture of salts selected for the membrane will be fluid at the temperature of use, but the melt will not have an excessive rate of flow or tendency to dry out or migrate from the inert support. The salt will be essentially non-volatile under conditions of use.

Although membranes, comprising a monomolecular layer of active molten salt in the inert porous support will function in accordance with this invention, it is preferred to use membranes, having a continuous film of molten active salt immobilized in or layered on the support, or a combination thereof. Membranes meeting this criterion will have very low permeability to a non-reactive gas at 760 torr and the temperature of use, as measured against the background content of non-reactive, inert sweep gas on the permeate side of the membrane. In a preferred case, the permeability of nitrogen as the inert sweep gas is selected as a standard and is below 20 Barrer under these conditions.

The support is selected from ceramic, metallic and organic polymeric materials, stable to the molten salt at the temperature of use, which are either rigid or slightly flexible and which do not react with the active molten salt or with the gas mixture being treated. A practical lower limit for the thickness of the self-supporting membranes support is below 0.02 centimeters, although some thinner materials may lack the rigidity required. However, ultrafine porous ceramic films, less than 20 micrometers in thickness are known, Leenaars et al., *J. Materials Science*, vol. 19 (1984), pages 1077–1088. It will be understood that the support can be coated on or adhered to another material, usually of greater porosity, which will provide the structural rigidity required. Preferably, the thickness of the support is 1–500 micrometers.

A "composite" or "asymmetric" membrane can also be used in the practice of this invention. These are prepared as described in Schweitzer, "Handbook of Separation Techniques for Chemical Engineers," McGraw Hill (1979), pages 2–19 to 2–26. In the case of the present invention, the membranes would comprise a fine porous layer, containing the molten salt, supported on a macroporous support of a polymeric, ceramic or metallic material.

It is further preferred that the support have a pore size of at least 0.003–200 micrometers, more preferably of 1–200 micrometers. It will be appreciated that large effective membrane areas can be attained by using a plurality of smaller membranes, connected by a manifold or other connecting means, or that a large membrane can be made mechanically strong by the use of supporting means, well known to those skilled in the art.

The active membrane can also be contained within a module of a configuration of hollow fibers, a spiral winding or a series of flat plates. A description of hollow fibers and spiral windings is given in Schweitzer, ibid., pages 2–61 to 2–65 and 2–21, respectively.

In any separation process, carried out under the principles of this invention, the maximum achievable flux of permeate gas per cross-sectional area of membrane is equal to the effective diffusion coefficient of the carrier (active molten salt), multiplied by the concentration gradient of carrier (driving force) between the two interfaces of the membrane. Thus, $$\text{Flux} = D \times (\Delta C/\Delta l)$$

$$(\text{cm}^3 \cdot \text{cm}^{-2} \cdot \text{sec}^{-1}) = (\text{cm}^2 \cdot \text{sec}^{-1}) \times (\text{cm}^3 \cdot \text{cm}^{-3}/\text{cm})$$

In general, the flux through a membrane may be expressed as the product of standard permeability times the cross-sectional area of the membrane, times $(\Delta P/\Delta l)$, wherein $\Delta P$ is the pressure difference across the membrane and $\Delta l$ is the thickness of the membrane.

As in any facilitated transport system, the actual flux will also depend on the kinetics of the reversible reactions of the permeating gas with the molten salt.

Permeability (Po) is expressed in Barrer units, that is, $$1 \text{ Barrer} = (\text{cm}^3 \cdot \text{cm} \times 10^{-10})/(\text{sec} \cdot \text{cm}^2 \cdot \text{cmHg})$$

When organic polymeric membranes are used and it is desired to express the gas flux through the membrane in a manner which reflects only the separation performance of the melt, a correction will be made for the porosity and tortuosity of the membrane, so that:

$$\text{Flux} = \text{Po} \cdot A \cdot (\Delta P/\Delta l) \cdot (\text{porosity}/\text{tortuosity})$$

Selectivity (S) for a mixture of gases, A and B, in which A is the permeate gas, is expressed by the ratio of permeabilities:

$$S = \text{Po}_A/\text{Po}_B$$

In the utilization of this invention, it is preferred to separate oxygen from other gases in a mixture, using a nitrate-containing salt melt.

Preferred melts are lithium nitrate or sodium nitrate, immobilized in a porous metallic or ceramic support. Preferred operating temperatures are above 400° C., more preferably above 450° C. Mixtures of nitrates, particularly of two or more sodium, lithium and potassium nitrates, containing a maximum of 99% by weight of any of the nitrates, are particularly preferred.

Selectivities approaching 200 for oxygen in air have been achieved, using the teachings of this invention. It will be appreciated that such selectivities are much higher than those observed for separation of oxygen-nitrogen mixtures using conventional polymer membranes, as shown in Table 1.

TABLE 1

Standard Permeabilities (Po) in Barrer Units, and Permeability Ratios (Selectivity) of Selected Polymer Membranes for Oxygen and Nitrogen

| Membrane | Po(O$_2$) | Po(N$_2$) | Po(O$_2$)/Po(N2) | T (°C.) |
|---|---|---|---|---|
| Poly(dimethyl siloxane) | 605 | 281 | 2.1 | 25 |
| Poly(4-methylentene-1) | 32.3 | 7.8 | 4.1 | 25 |
| Butyl Rubber | 1.3 | 0.32 | 4.1 | 25 |
| High Density Polyethylene | 0.40 | 0.14 | 2.9 | 25 |
| Teflon FEP | 4.9 | 1.59 | 3.1 | 25 |

Taken from Polymer Handbook, 2nd edition, J. Brandrup and E. H. Immergut, eds., John Wiley and Sons, New York, 1975, pages III, 229–280.

BRIEF DESCRIPTION OF THE DRAWINGS

In FIG. 1 is shown a side view of a membrane, useful for the practice of the invention.

In FIGS. 2, 3 and 4 are shown a test apparatus for demonstrating the principles of this invention, including a membrane, membrane holder and test cell.

BEST MODE FOR CARRYING OUT THE INVENTION

In a most preferred aspect, the method of this invention will be separation of oxygen from other gases, using molten sodium or lithium nitrate, immobilized in a porous metal support, at a temperature above 400° C.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, temperatures are set forth uncorrected in degrees Celsius. Unless otherwise indicated, all parts and percentages are by weight.

For experiments at high temperatures, a membrane comprising a thin film (about 0.2 mm) of a molten salt supported in a porous metallic or ceramic material, was used. In a typical case, the membrane support was a circular piece of #304 stainless steel woven wire mesh (about 0.02 cm in thickness, pore size from 4–13 micrometers, Pall Corp., Cortland, N.Y.), supported rigidly between two Inconel 600 rings about 10 cm in inner diameter. The mesh was loaded with a salt by melting the dry salt into its pores, until at least enough salt was used to provide a visibly continuous molten film on one surface of the wire mesh. The thus-coated mesh and support assembly was sealed into a sample cell. In FIGS. 2 and 3 are shown a top view and a side view, respectively, of a holder assembly 4 for a wire mesh membrane support. In FIG. 4 is shown the sample cell 5, including the gold O-ring with which the support assembly is sealed into the sample cell.

The sample cell or module 5, as shown in FIG. 4, was provided with means for introducing feed gas through feed inlet 7 on the feed side of the membrane 1 and for removal of a gas stream, rejected by the membrane through reject outlet 8; with permeate sweep gas inlet 10 on the opposite side of the membrane, for passing sweep gas over the membrane 1 and permeate outlet means 11 for conveying permeate gases and carrier gases to an analyzer means. The apparatus was housed in a thermostatted, tubular, high-temperature heating mantle and could operate at temperatures up to about 550° C. The experimental assembly also included a gas manifold and was further provided with electronic mass flow controllers to permit precise blending of feed gas mixtures. A gas chromatograph was used for analysis of the permeate gases in the sweep stream.

A low temperature cell, otherwise as in FIGS. 2–4, was constructed and thermostatted in a bath of ethylene glycol. The porous inert support was, for example, Celgard ™ (Celanese Corp., thickness 0.0027 cm, area 2.56 cm$^2$, pore dimensions 0.4×0.04 micrometers, tortuosity 1.25, porosity 0.5).

EXAMPLE 1

Separation of Oxygen from Air using a Lithium Nitrate Immobilized Molten Salt Membrane Stainless steel woven wire mesh (#304, about 0.02 cm thick, 4–13 micrometers pore size, area about 0.8 cm$^2$) was coated with molten lithium nitrate by grinding dry lithium nitrate and placing it on the mesh under an atmosphere of dry argon. The cell was closed, connected to a gas manifold and heated to 285° C. under a feed flow of 10 cm³/min of nitrogen and permeate flow of 10 cm³/min of helium at 1 atm pressure for about 20 hr. At the end of this time the lithium nitrate had wetted the stainless steel mesh and formed a visibly continuous molten film on one surface of the wire mesh, and thus separated the feed and permeate sides of the cell.

The cell was then heated to a furnace temperature of 429° C., using a feed flow of 10 cm³/min of zero grade air and a sweep flow on the permeate side of the membrane of 10 cm³/min of helium, both at about 1 atmosphere pressure and 25° C. The total pressure in the cell during the experiments was about 760 torr.

The concentration of gases in the permeate stream was determined by gas chromatography, using a 183 cm 5A molecular sieve column for nitrogen and oxygen, operated isothermally at 60° C. After the system had stabilized at the operating temperature, there was no leak of nitrogen across the membrane, as indicated by very low nitrogen permeability.

It was observed that oxygen permeability increased gradually over 42 hours of heating. This was attributed to an increase in the concentration of oxides ($O^=$, $O_2^=$, $O_2^-$) in the molten salt. It is proposed that the dissolved oxides in the molten salt catalyzed the reaction:

$$2NO_3^- \rightleftharpoons 2NO_2^- + O_2$$

Nitrogen permeability was constant (about 12 Barrers). The following results were obtained:

| Hours (429° C.) | Permeability (Oxygen, Barrer) | Selectivity $S = PoO_2/PoN_2$ |
| --- | --- | --- |
| 0 | 243 | 20 |
| 5.8 | 356 | 29 |
| 10.0 | 496 | 41 |
| 20.0 | 990 | 82 |
| 30.9 | 1530 | 127 |
| 42.3 | 2065 | 172 |

These results show that a lithium nitrate immobilized salt membrane functioned well for a reasonable time, and had good permeability and selectivity for oxygen.

EXAMPLE 2

Separation of Oxygen from Air using a Sodium Nitrate Immobilized Molten Salt Membrane A molten salt membrane of a sodium nitrate was immobilized in a stainless steel wire mesh as in Example 1. The sodium nitrate was loaded onto the stainless steel mesh under an argon atmosphere and the cell was attached to the gas manifold. The cell was heated to 323° C. under a feed flow of 10 cm³/min of nitrogen and a permeate flow of 10 cm³/min of helium for about 15 h at 760 Torr. The feed gas was then changed to 10 cm³/min of zero grade air at 760 Torr.

The cell was heated gradually to 450° C., but no oxygen was detected in the permeate stream, using the analytical method of Example 1. At 477° C., oxygen was observed in the permeate. An essentially constant value was reached after 4 h. The cell was held at 477° C. for 18 h and then the temperature was varied between 452° C. and 525° C. to determine the effect of temperature on oxygen permeability. Results were:

| Temperature (°C.) | Permeability (Oxygen, Barrer) | Selectivity ($S = PoO_2/PoN_2$) |
| --- | --- | --- |
| 452 | 58 | 4 |
| 477 | 172 | 12 |
| 500 | 439 | 31 |
| 525 | 1110 | 79 |

Nitrogen permeability remained relatively constant, at 12–15 Barrer. This example shows that sodium nitrate immobilized molten salt can be used for the separation of oxygen from air.

We claim:

1. A process for separating a gas from at least one other gas in a mixture, comprising passing the mixture over a membrane selectively permeable to the gas being separated, which membrane comprises a thin, porous, inert support within the pores of which is immobilized an active material and the active material is a molten salt capable of undergoing one or more reversible oxidation-reduction reactions with the gas being separated.

2. The process of claim 1, wherein the reversible oxidation-reduction reaction is nitrate-nitrite interconversion.

3. The process of claim 1, wherein the reversible oxidation-reduction reaction is one or more of oxide-superoxide, oxide-peroxide or peroxide-superoxide interconversions.

4. The process of claim 1, wherein the reversible oxidation-reduction reaction is hydrogen-hydride interconversion.

5. The process of claim 1, wherein the reversible oxidation-reduction reaction is nitrate-nitrite interconversion, oxygen is the gas being separated and the active material in the membrane is molten lithium nitrate.

6. The process of claim 1, wherein the reversible oxidation-reduction reaction is nitrate-nitrite interconversion, the gas being separated from the mixture is oxygen and the active material in the membrane is molten sodium nitrate.

7. The process of claim 1, wherein the reversible oxidation-reduction reaction is nitrate-nitrite interconversion, the gas being separated from the mixture is oxygen and the active material in the membrane is a mixture of two or more of sodium nitrate, lithium nitrate and potassium nitrate, containing a maximum of 99% by weight of any of the nitrates.

8. The process of claim 1, including removing gas passing through the membrane by a stream of sweep gas.

9. The process of claim 1, including removing gas passing through the membrane using a compressor.

10. The process of claim 1, wherein the porous membrane containing the molten salt is supported in a macroporous support comprising metallic, ceramic or polymeric material.

11. The process of claim 1, wherein the membrane is contained within a module in the configuration of hollow fibers, a spiral winding or a series of flat plates.

12. A process for separating a gas from at least one other gas in a mixture comprising introducing the mixture into a module having at least a feed inlet and a permeate gas outlet and containing a membrane selectively permeable to the gas being separated, which membrane comprises a thin, porous inert support within the pores of which is immobilized an active material and the active material is a molten salt capable of undergoing at least one reversible oxidation-reduction reaction with the gas being separated; passing the gas mixture through the feed inlet and into contact with the inlet side of the membrane; removing from the inlet side of the membrane a gas stream rejected by the membrane and removing through the permeate gas outlet the gas passing by reaction through the membrane.

13. The process of claim 12, wherein the gas passing by reaction through the membrane is removed by a stream of sweep gas.

14. The process of claim 12, wherein the gas passing by reaction through the membrane is removed by a compressor.

15. The process of claim 12, wherein the module comprises a membrane contained within a configuration of hollow fibers.

16. The process of claim 12 wherein the module comprises a membrane contained within a configuration of a spiral winding.

17. The process of claim 12, wherein the module comprises a membrane contained within a configuration of a series of flat plates.

18. A selectively-permeable membrane for the separation of a gas from a mixture of gases, comprising a thin, porous, inert support in which is immobilized a molten active material, which active material is a molten salt capable of undergoing one or more reversible oxidation-reduction reactions with the gas being separated.

19. The membrane of claim 18, wherein the support is a ceramic, metallic or organic polymeric material.

20. The membrane of claim 18, wherein the support is metallic.

21. The membrane of claim 18, wherein the support is 1–500 micrometers in thickness, has a pore size of 0.003–100 micrometers and is coated with a continuous film of molten active material.

22. The membrane of claim 18, wherein the support is less than 0.02 cm in thickness, has a pore size of 2–100 micrometers, is coated with a continuous film of molten active material and has a permeability to nitrogen below 20 Barrers at 760 Torr at the temperature of use.

23. The membrane of claim 18, wherein the active material is molten lithium nitrate and the support is stainless steel mesh.

24. The membrane of claim 18, wherein the active material is molten sodium nitrate and the support is stainless steel mesh.

25. The membrane of claim 18, wherein the active material is a molten mixture of at least two of sodium nitrate, lithium nitrate and potassium nitrate, containing a maximum of 99% by weight of any of the nitrates.

26. The membrane of claim 18, wherein the membrane is within a configuration of a hollow fiber.

27. The membrane of claim 18, wherein the membrane is within a configuration of a spiral winding.

28. The membrane of claim 18, wherein the membrane is within a configuration of a series of flat plates.

* * * * *